United States Patent [19] [11] 3,691,459
Anderson [45] Sept. 12, 1972

[54] MICROWAVE POWER DENSITY METER

[72] Inventor: Harold C. Anderson, New Brighton, Minn.

[73] Assignee: Litton Systems, Inc.

[22] Filed: Oct. 23, 1970

[21] Appl. No.: 83,314

[52] U.S. Cl. .................................. 324/95, 343/703
[51] Int. Cl. .............................................. G01r 23/04
[58] Field of Search.250/39 R; 324/95; 343/100 ME, 343/703

[56] References Cited

UNITED STATES PATENTS

| | | | |
|---|---|---|---|
| 2,509,045 | 5/1950 | Salisbury | 343/703 |
| 3,056,926 | 10/1962 | Borck et al. | 343/786 |
| 3,109,988 | 11/1963 | Hoover | 343/703 |
| 3,446,074 | 5/1969 | Thomas | 343/100 ME |
| 3,464,010 | 8/1969 | Saul | 324/95 |

*Primary Examiner*—Eli Lieberman
*Attorney*—Franklin D. Jankosky, Walter R. Thiel, Alfred B. Levine and Alan C. Rose

[57] ABSTRACT

A power density meter for monitoring the energy density of an electromagnetic field, having a first radiant field and a stationary field, in the near-zone region of an electromagnetic apparatus. The power density meter comprises an antenna arrangement having a conical horn, a stub, an output portion and an input portion. The electromagnetic wave energy of the radiant field is received by the horn and stub. The input portion is located in front of the horn and comprises a sheet of lossy material sandwiched between a pair of thin sheets of plastic. When the lossy material is brought into the stationary field, a current is induced into the material which is representative of the electromagnetic energy of the stationary field. The current established in the lossy material generates a second radiant field which is additive to the first radiant field of the electromagnetic wave energy. The output portion includes a cryster detector receiving the combined electromagnetic energy from the first and second radiant fields. A circuit is provided for coupling the detector to a meter so that a signal representative of the value of the power density in the near-zone region may be displayed on the meter.

10 Claims, 5 Drawing Figures

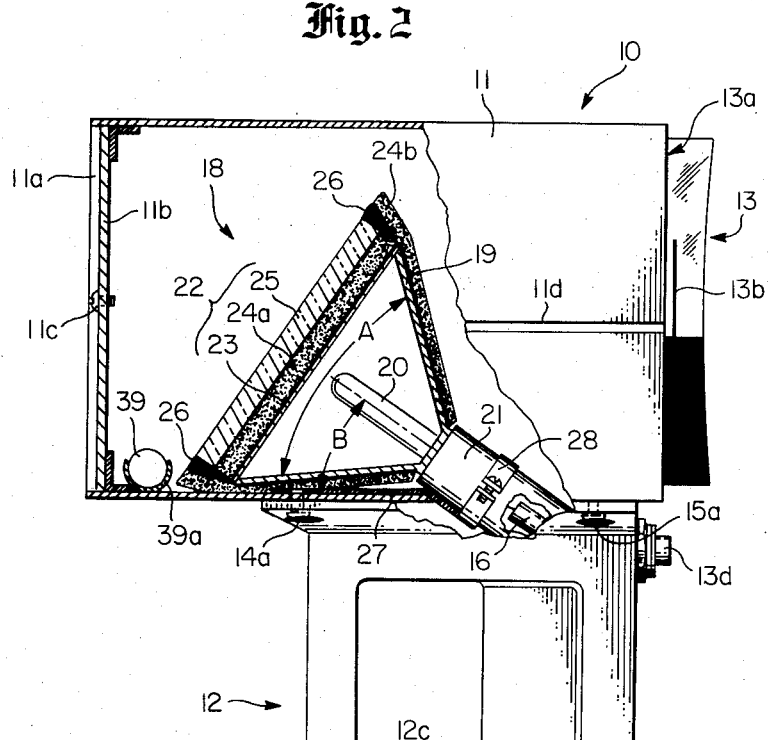
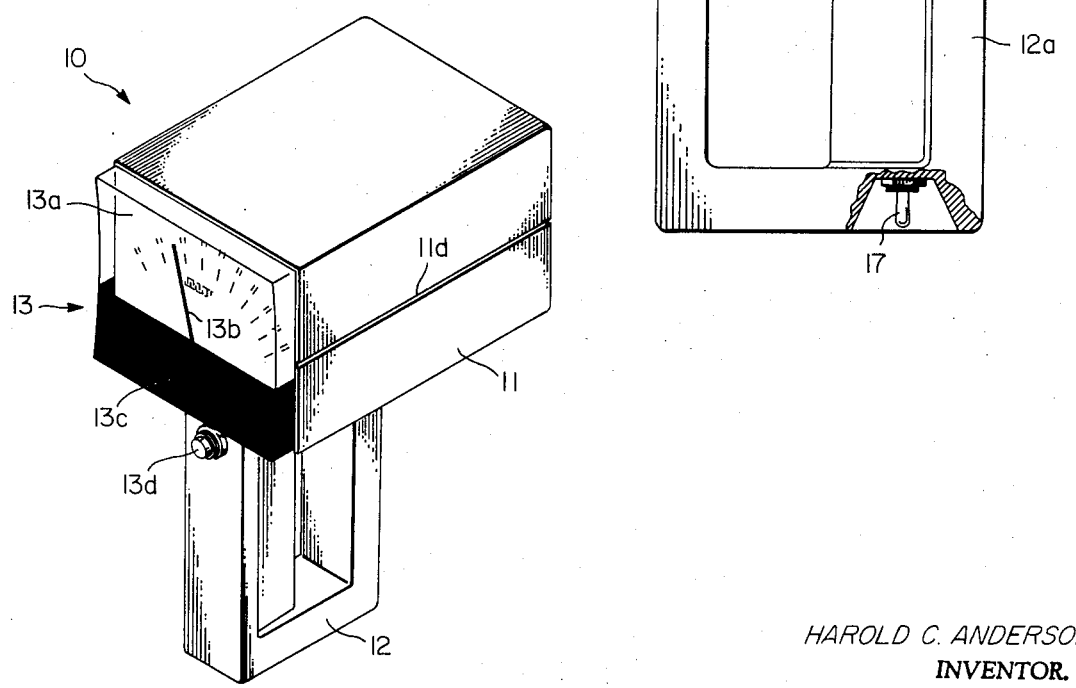

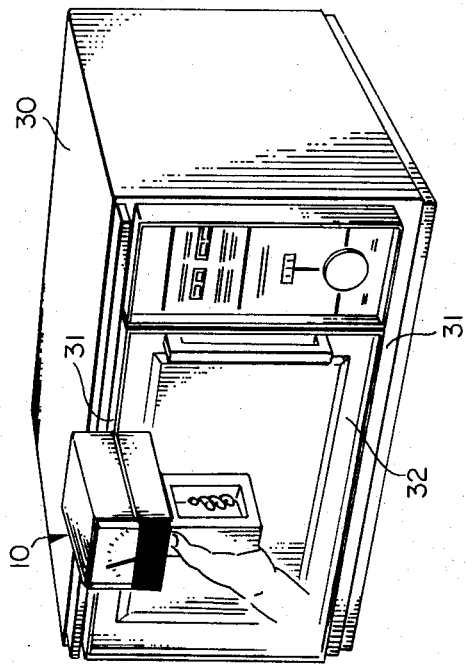
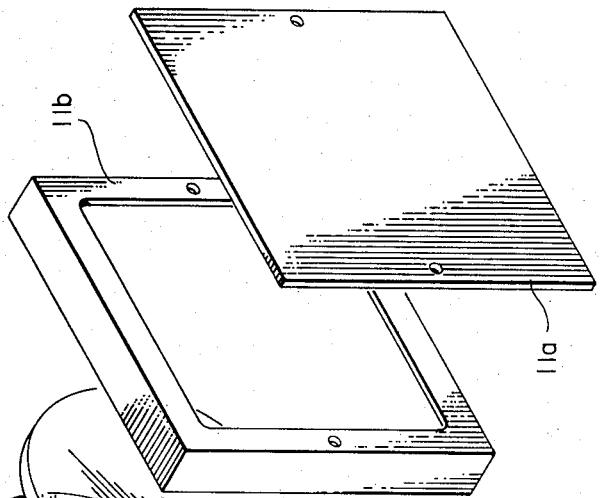
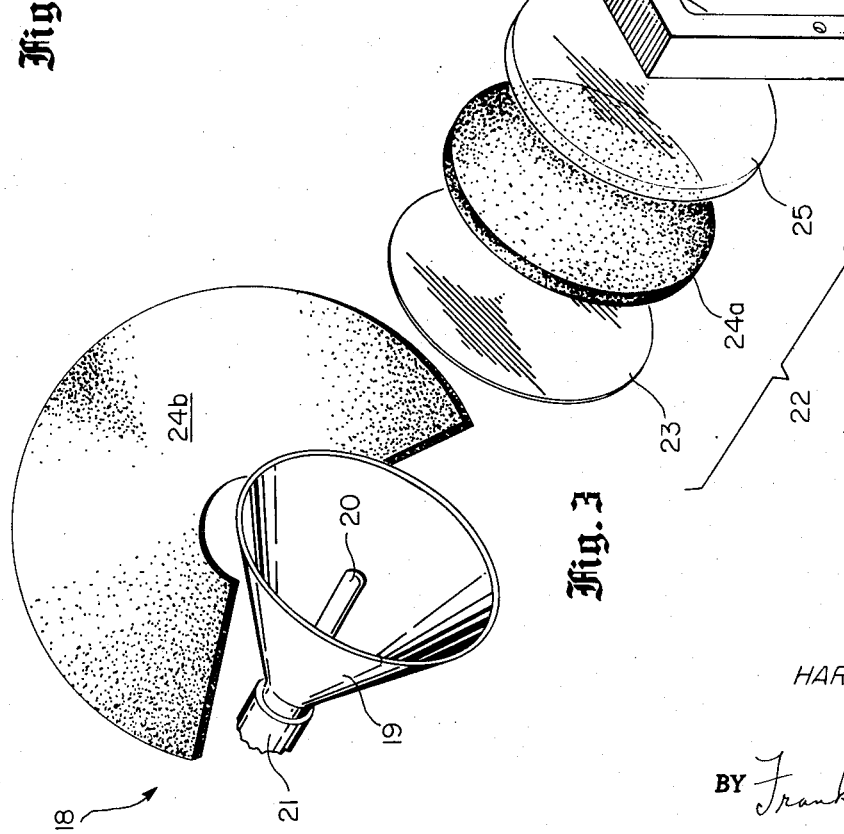
HAROLD C. ANDERSON
INVENTOR.
BY Franklin D. Jankovsky
ATTORNEY

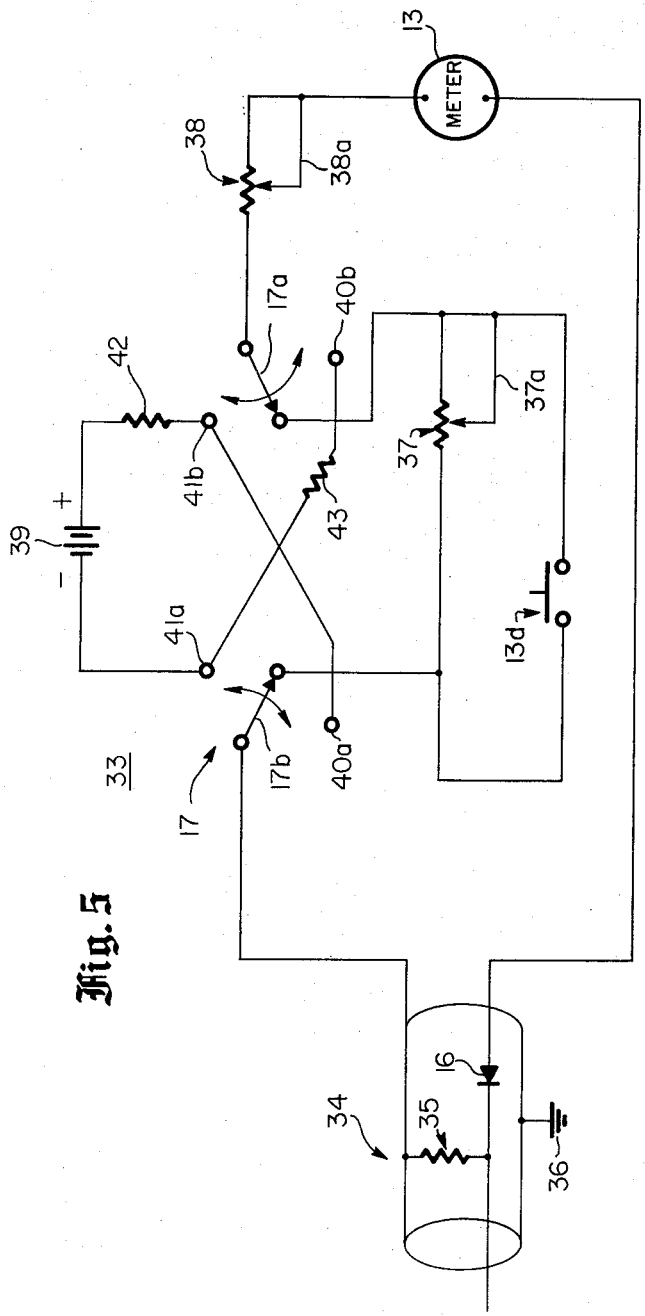

3,691,459

MICROWAVE POWER DENSITY METER

FIELD OF THE INVENTION

This invention relates to devices for detecting electromagnetic wave energy and more particularly to a device for detecting electromagnetic wave energy in a near-zone region of an electromagnetic apparatus, such as, a microwave oven.

DESCRIPTION OF THE PRIOR ART

Within the last decade, microwave ovens have become increasingly popular as a means for rapidly cooking foodstuffs. The typical microwave oven has a source of electromagnetic wave energy operating at approximately 2.45 gigahertz. The foodstuffs are inserted and removed from a cavity, or heating area of the microwave oven, via an oven door which completes the cavity. Nearly all prior art oven doors utilize an electromagnetic wave energy seal located within the door to attenuate stray electromagnetic wave energy. Theoretically, one could construct an ideal oven door which would provide a perfect seal to ensure that electromagnetic wave energy does not escape from the cavity of the microwave oven; however, such an oven door would not be practical because of inconvenience and expense. In addition, even the experienced microwave oven user could defeat the purpose of the ideal oven door. Therefore, as a practical matter, some electromagnetic wave energy will escape from the present microwave ovens.

Prior art detection devices exist which measure power density of the electromagnetic wave escaping through the edges of the microwave oven doors; however, such devices are expensive, subject to breakdown, or do not accurately detect the power density of the electromagnetic field in the near-zone region of the microwave oven door, the near-zone region, at a frequency of 2.45 gigahertz, being defined as approximately within 5 centimeters from a point of escape of the electromagnetic wave from the microwave oven. For example, one type of detection device presently on the market employs pairs of mutually perpendicularly placed thermisters responsive to electromagnetic wave energy regardless of the polarization of the electromagnetic wave energy. Another type utilizes a thermister that is part of a D.C. bridge circuit in conjunction with a pick-up stub that is part of a conventional horn antenna. Still another type of detection device utilizes a bulb filled with gas and the surface of the bulb is coated with a lossy material which converts electromagnetic wave energy into heat, which in turn causes the gas in the bulb to expand. The amount of expansion of the gas is the measure of the power density of the electromagnetic wave escaping from an electromagnetic apparatus. Still another type of electromagnetic wave energy device employs a bolometer to detect electromagnetic wave energy. However, it has been found that in the near-zone region of an electromagnetic radiator, the prior art devices only measure the radiating field of the electromagnetic wave rather than both the stationary and radiating fields established by the electromagnetic wave, or if there is a contribution from the stationary field it is not in proper proportion to the energy density in the radiating field. Furthermore, the presence of a metallic receiving antenna distorts the field established so that an accurate reading cannot be obtained. Efforts have been made to cut down on such distortion by employing a metallic dipole that is relatively small. In order to compensate for the loss of signal pick-up in using a small dipole, the bolometer employed is very fragile, thus it is subject to frequent burnout. In the case of the gas-filled bulb, such an arrangement has been found not to be practical because of the inherent slow response of the gas to changes in the power density of the electromagnetic wave in the near-zone region.

Accordingly, it is an object of the present invention to provide a power density meter for obtaining accurate measurement of the power density of an electromagnetic field in the near-zone region of a microwave oven.

It is a further object of the present invention to provide a power density meter which simulates the resistive characteristics of human flesh.

It is a still further object of the present invention to provide a power density meter for measuring the contribution of both the stationary and radiating fields of the electromagnetic wave in the near-zone region of a microwave oven.

It is another object of the present invention to provide a power density meter having a fast response to changes in the power density of an electromagnetic field in the near-zone region of a microwave oven.

It is still another object of the present invention to provide a relatively inexpensive yet durable power density meter for measuring the power density of an electromagnetic field.

It is yet another object of the present invention to provide a power density meter which does not distort the field of an electromagnetic wave within the near-zone region of a microwave oven.

SUMMARY OF THE INVENTION

In its broadest aspect, the power density meter for measuring the energy density of an electromagnetic field having a first radiant field and a stationary field comprises an antenna for receiving the electromagnetic wave energy of the first radiant field. The antenna further includes a sheet of lossy material for establishing a current induced by the stationary field, and generating a second radiant field which is additive to the first radiant field. A detector is coupled to the antenna for detecting the current established by the combined first and second radiant fields. A circuit is provided for coupling the detector to a meter so that a signal representative of the value of the power density in the near-zone region may be displayed on the meter.

BRIEF DESCRIPTION OF THE DRAWINGS

Additional objects, advantages and characteristic features of the present invention will become readily apparent from the following detailed description of the preferred embodiments of the invention when taken in conjunction with the accompanying drawings in which:

FIG. 1 is a perspective view of a power density meter for measuring the power density of an electromagnetic field in accordance with the present invention;

FIG. 2 is a side elevational view of the power density meter for measuring the power density of an electromagnetic field, wherein one side of the meter housing and portion of the antenna are exposed, in accordance with the present invention;

FIG. 3 is an exploded view of the antenna of the power density meter in accordance with the present invention;

FIG. 4 is a perspective view of the power density meter placed in the near-zone region of a microwave oven in accordance with the present invention; and FIG. 5 is a schematic diagram of the electrical circuit of the power density meter in accordance with the present invention.

DESCRIPTION OF THE PREFERRED EMBODIMENTS

Referring now to FIG. 1, there is shown a perspective view of a power density meter 10 in accordance with the present invention. The power density meter 10 includes an antenna housing 11, a handle 12 and a meter 13. The meter 13 includes a scale 13a, a pointer 13b, a zero adjustment screw 13c and a switch 13d for changing scales of the meter 13. The antenna housing 11 may be of any non-metallic material which does not have a substantial effect on an electromagnetic field, such material as polyurethane or polypropylene. The handle 12 may be of any suitable metallic material, such as, aluminum, which shields the electrical components located within the handle 12 from electromagnetic fields.

Referring now to FIG. 2, there is shown a side elevational view of the power density meter 10 having one side of the meter housing and portions of the antenna exposed to illustrate components of the power density meter 10. Within the antenna housing 11, there is shown an antenna 18. The antenna 18 includes a conical horn 19, a stub 20, an output portion 21 and an input portion 22. The conical horn 19 has a flare angle of 80°, as defined by the illustrated angle A. The stub 20 is positioned at an angle of 35° from its centerline (c/l) to the bottom inner portion of the antenna housing 11, as defined by the illustrated angle B. The input portion 22 is comprised of a thin sheet of plastic 23, a first of lossy material 24a and a thick sheet of plastic 25. Another sheet of lossy material 24b is shown wrapped around the conical horn 19. The output portion 21 includes a crystal detector 16.

The input portion 22 and the sheet of lossy material 24b may be mounted to the antenna 18 by means of conventional adhesive means 26 as shown. The antenna 18 may be mounted to the antenna housing 11 by means of a sloping T-shaped member 27, the screw 14a, and a like screw (not shown) on the opposite end of member 27, and the retention means 28, which may be a clamp and screw and nut arrangement, as illustrated. The antenna 18 may be enclosed within the antenna housing 11 by means of a front plate 11a which may be secured to the antenna housing 11 by means of mounting means 11b and a pair of screws 11c. The front plate 11a and the mounting means 11b may be of the same non-metallic material as the antenna housing 11, and the screws 11c may be of plastic material. A 1.5 V conventional battery 39 is shown mounted within the antenna housing 11 by means of mounting means 39a. Further explanation of the operation of the antenna 18 will follow in the discussion of FIGS. 3, 4 and 5.

Other components utilized for monitoring the power density of the electromagnetic wave emanating from a microwave oven are located within a back portion 12a of the handle 12. A switch 17 which may be utilized to check the operational status of the crystal detector 16 is located in the bottom portion of the handle 12. The handle 12 also includes a front portion 12b which, along with the back portion 12a forms hand-gripping area 12c.

Referring now to FIG. 3, there is shown an exploded view of the receiving end of the antenna 18. As stated earlier, the antenna 18 includes the conical horn 19, the stub 20, the output portion 21 and the input portion 22. The sheet of lossy material 24b is shown in its unwrapped position and the various parts of the antenna input portion 22 are shown in their respective exploded positions relative to the conical horn 19 and they include the thin plastic sheet 23, the sheet of lossy material 24a, and the thick sheet of plastic 25. Further shown is the mounting means 11b and the sheet of housing 11a.

One of the distinguishing features of the present invention is the use of the sheet of lossy material 24a. The purpose of this invention is to monitor the electromagnetic energy escaping from a microwave oven, in order to evaluate and correct any potential hazard to a human being. As is well known, a lossy material will absorb electromagnetic energy, while a material having high conductivity, such as metal, will not absorb energy from an electromagnetic wave. The flesh of a human being is an example of a lossy material. Thus, the use of a sheet of lossy material within the input portion 22 simulates the human flesh. The lossy material 24a may be a low-density, high-loss, flexible foam material, sold commercially under the trade name ECCOSORB. The sheets of plastic 23 and 25 may be lucite. The purpose of the sheet of plastic 25 is to provide a boundary over which the electromagnetic wave may propagate with a minimum loss of energy. The thin sheet of plastic 23 merely provides suitable rigid means so that the sheet of lossy material 24a will remain in place.

As is well known, the Federal Communications Commission has allocated specific fixed frequencies for industrial, scientific and medical purposes. While the present invention may be utilized to monitor various frequencies, the power density meter 10 illustrates components specially designed and arranged to monitor electromagnetic wave energy emanating from a microwave oven that is operating at a frequency of approximately 2.45 gigahertz. The conical horn 19 has a flare angle of approximately 80°. The length of the conical horn is 1.9 inches. The stub 20 is 1.25 inches long and 2.5 inches in diameter and the feed point impedance is approximately 50 ohms. The sheet of plastic 25 is polypropylene that is approximately 0.25 inches thick and has a dielectric constant of approximately 2.5. The sheet of lossy material 24a is ECCOSORB that is approximately 0.25 inches thick and has a dielectric constant of 10, a loss tangent of 4, and a wave impedance of about $120 + j60$ ohms. The outer surface of the conical horn 19 is enclosed with the sheet of lossy material 24b, also ECCOSORB, to reduce reflections from the metal surface of the surface of the conical horn 19. It should be understood that while the antenna 18 illustrated has components specifically designed to measure the power density of electromagnetic energy of 2.45 gigahertz, the components may be designed to measure the power density of electromagnetic energy of other frequencies, for example, 0.915 gigahertz, and the basic theory of the power density meter 10 would still be in the scope of the contemplated invention.

Referring now to FIG. 4, there is shown a perspective view of the power density meter 10 placed in position to monitor to electromagnetic energy escaping from a microwave oven 30. In order to obtain an accurate reading of such electromagnetic energy, the power density meter 10 should be placed within the near-zone region of the escape of such electromagnetic energy, i.e., within 5 centimeters of the exit of such electromagnetic energy. The likely exit of the electromagnetic energy occurs around the perimeter 31 of the door 32 of the microwave oven 30. The maintenance man testing the power density of the electromagnetic field emanating from the microwave oven 30 may hold the power density meter 10 against any part of the perimeter 31 to monitor the power density of the electromagnetic field in that particular area. The antenna 18 is positioned within the antenna housing 11 so that the effective center of the pick-up of the antenna 18 is at a distance of 5 centimeters from the exit of any electromagnetic energy emanating from the microwave oven 30 when the front panel 11a of the power density meter 10 is approximately flush with the door 32. As is shown in FIG. 4, and may be more clearly seen in FIG. 1, the power density meter 10 is provided with a pair of guide lines 11d on the opposite panels of the antenna housing 11. The guide lines 11d are aligned with the effective center of the pick-up of the antenna 18, and at right angles to the plane of polarization of the electromagnetic field emanating from the microwave oven 30. Thus, the maintenance man may utilize the guide lines 11d to align the antenna 18 with the electrical field (E field) of the electromagnetic wave emanating from the perimeter 31 of the microwave oven 30 in order to obtain an accurate reading of the power density of such electromagnetic field. While the antenna 18 is so designed that the maintenance man should align the guide lines 11d with the perimeter 31 of the door 32, the power density meter 10 may be rotated somewhat around the perimeter 31 and an accurate reading of the power density will still be obtained.

Referring now to FIGS. 2, 3 and 4, the operation of the antenna 18 will now be discussed. The opening around the door 32, as defined by the perimeter 31, is effectively a slot antenna. A slot antenna may be represented as an equivalent radiating dipole antenna. As is well known in the art, in the vicinity of an electromagnetic radiator, such as a radiating dipole antenna, there are two electromagnetic fields, namely, the radiant field and the stationary field. The stationary field increases and decreases with time depending on the field established, but no energy is lost in space, while the radiant field represents a loss of energy in space. In prior art power density meters, the electromagnetic energy of the stationary field would be reflected back and forth between such meters and the door of the microwave oven. On the other hand, if a material having a high-loss tangent, such as ECCOSORB, is brought into the stationary field, a conduction current is induced into the material as a result of being exposed to the stationary field. Thus, a sheet of lossy material 24a of the antenna 18 serves as a means for inducing induction current. Of course, a portion of the electromagnetic energy in the stationary field induced into such material is converted into heat. The respective E fields of the stationary field and the radiating field are out of phase. However, the existence of induced current in the ECCOSORB will establish a second radiating field that is in phase with and is additive to the first radiating field. A sheet of lossy material 24a of a selected thickness is employed that provides an energy loss equal to the gain of the combination of the conical horn 19 and the stub 20 so that the meter 13 displays an accurate reading of the power density of the electromagnetic field being monitored.

The thick sheet of plastic material 25 serves as a means of providing low reflection at the entry boundary region of the lossy material 24a so that the amount of electromagnetic energy reflected back to the microwave oven 30 by the lossy material 24a is negligible. If a pick-up antenna 18 is placed behind the sheet of lossy material 24a, a perfect pick-up antenna will reflect half of the incident electromagnetic energy. Such reflected energy will be further attenuated on passing back through the sheet of lossy material 24a. Thus, the undesirable condition of trapping of electromagnetic energy, or undetected bouncing thereof, between a metallic pick-up antenna and the front of a metallic housed microwave oven is avoided.

Referring now to FIG. 5, there is shown a schematic diagram of an electrical circuit 33 of the power density meter 10, in accordance with the present invention. The electrical circuit 33 rectifies the current established in the antenna 18 in order that the meter 13 may display the power density of the electromagnetic field emanating from the microwave oven 30. Illustrated on the left hand side of FIG. 5 is a coaxial input section 34 which is a schematic representation of the output portion 21 of the antenna 18. The coaxial input section 34 includes the crystal detector 16, a resistor 35 and a ground 36. The crystal detector 16 rectifies the current established by the contribution of the stationary and radiating fields that were discussed earlier, and the resistor 35 provides impedance matching between the antenna 18 and the load or meter 13. In addition, the resistor 35 provides a D.C. return path for the rectified current.

Further shown is the switch 17 in its normal unactuated position to allow the rectified current to pass to the meter 13. The meter 13 will display the rectified current as milliwatts per square centimeter (mw/cm$^2$). The switch 17 is shown in its normal unactuated position wherein the rectified current will pass through a pair of 20,000 ohm potentiometers 37 and 38. When the switch 13d is unactuated, the range of the meter scale 13a is 0–100 mc/cm$^2$, and when the switch 13d is actuated, the rectified current will bypass the potentiometer 37 and the range of the meter scale 13a is 0–10 mw/cm$^2$. The potentiometers 37 and 38, respectively, include wiper arms 37a and 38a to respectively calibrate the aforementioned ranges.

Referring now to the upper center portion of the schematic diagram of the electrical circuit 33, there is shown a 1.5 V battery 39 to provide an electrical source for checking the operational status of the crystal detector 16. A pair of 5,000 ohm resistors 42 and 43 reduce the voltage applied across the crystal detector 16. The switch 17 is a toggle switch which may be actuated from its central position in two oppositely opposed directions to provide current paths in both directions to the crystal detector 16. The crystal detector 16 is operational if the meter 13 displays a high and low reading on actuation of the pair of switch poles 17a and 17b between the two pair of contacts 40a and 40b and 41a and 41b. If the crystal detector 16 is shorted, a high reading on the meter 13 will be obtained when current is passed in either direction through the crystal detector 16, and if the crystal detector 16 is open, no reading will be obtained on the meter 13.

Thus, although the present invention has been shown and described with reference to particular embodiments, for example, a power density meter having various size components for monitoring electromagnetic apparatus operating at 2.45 gigahertz, nevertheless, various changes in modifications obvious to a person skilled in the art to which the invention pertains, for example, modifications to the size of the conical horn and stub combination in order to monitor electromagnetic apparatus operating at 0.915 gigahertz, are deemed to lie within the spirit, scope, and contemplation of the invention as set forth in the appended claims.

What is claimed is:

1. Apparatus for measuring the power density of an electromagnetic field, having a first radiant field and a stationary field, in the near-zone region of an electromagnetic wave energy device comprising:
   antenna means for receiving electromagnetic wave energy of the radiant field, said antenna means further including means including a sheet of lossy material for establishing a current induced by the electromagnetic wave energy of the stationary field, and generating a second radiant field which is additive to the first radiant field of said electromagnetic wave energy;
   detection means coupled to said antenna means for detecting the current established by the combined first and second radiant fields;
   meter means for displaying the power density of said electromagnetic field; and
   circuit means for coupling said detection means to said meter means.

2. Apparatus for measuring the power density of an electromagnetic field in the near-zone region of an electromagnetic wave energy generating device as recited in claim 1 wherein said detection means is a crystal detector.

3. Apparatus for measuring power density of an electromagnetic field in the near-zone region of an electromagnetic wave energy generating device as recited in claim 2 which further includes means for checking the operational status of said crystal detector.

4. The invention of claim 1 wherein said lossy material has electrical qualities approximating those of human flesh.

5. Apparatus for measuring the power density of an electromagnetic field in the near-zone region of an electromagnetic wave energy device comprising:
   antenna means for receiving electromagnetic wave energy, said antenna means including a sheet of lossy material for establishing a current induced by the stationary field of said electromagnetic wave energy;
   detection means coupled to said antenna means for detecting the current established by said electromagnetic field;
   meter means for displaying the power density of said electromagnetic field;
   circuit means for coupling said established current to said meter means; and
   said antenna means comprising a conical-shaped horn and a stub combination for receiving said electromagnetic wave energy, and said sheet of lossy material, which is located within said conical-shaped horn and in front of said stub.

6. Apparatus for measuring the power density of an electromagnetic field in the near-zone region of an electromagnetic wave energy generating device as recited in claim 5 wherein the lossy material is of such a thickness that the energy loss incurred therein is equal to the gain of said conical-shaped horn and stub arrangement.

7. Apparatus for measuring the power density of an electromagnetic field in the near-zone region of an electromagnetic wave energy device comprising:
   antenna means for receiving electromagnetic wave energy, said antenna means including a sheet of lossy material for establishing a current induced by the stationary field of said electromagnetic wave energy;
   detection means coupled to said antenna means for detecting the current established by said electromagnetic field;
   meter means for displaying the power density of said electromagnetic field;
   circuit means for coupling said established current to said meter means; and
   said antenna means comprising a conical-shaped horn and stub combination for receiving said electromagnetic wave energy, first plastic means located in front of said combination for allowing the electromagnetic wave energy to propogate said antenna means with a minimum loss of energy, said sheet of lossy material being located behind said first plastic means, and second plastic means being located between said sheet of lossy material and said combination, said plastic means retaining said sheet of lossy material in a rigid position.

8. Apparatus for measuring the power of an electromagnetic field in the near-zone region of an electromagnetic wave energy generating device as recited in claim 7 wherein said electromagnetic wave energy generating device operates at a frequency of 2.45 gigahertz, and said antenna means is located within a non-metallic housing, said housing having guidelines to allow said antenna means to be aligned with the E field of the electromagnetic wave emanating from said electromagnetic wave energy generating device.

9. Apparatus for measuring the power density of an electromagnetic field in the near-zone region of an electromagnetic wave energy device as recited in claim 8 wherein:
   said conical-shaped horn has a flare angle of 80°;
   said stub is positioned at an angle of 35° from its center line to the bottom inner portion of said non-metallic antenna housing;
   said first plastic means is one-quarter inch thick;
   said sheet of lossy material is one-quarter inch thick; and
   said second plastic means is less than one-quarter inch thick.

10. Apparatus for measuring power density of an electromagnetic field in the near-zone region of an electromagnetic wave energy generating device as recited in claim 9 wherein said first plastic means is polypropylene having a dielectric constant of approximately 2.5, and said sheet of lossy material has a dielectric constant of 10, a loss tangent of 4 and a wave impedance of approximately $120 + j60$ ohms.

* * * * *